United States Patent
Hu et al.

(10) Patent No.: US 9,279,922 B2
(45) Date of Patent: Mar. 8, 2016

(54) LIGHT REFLECTIVE FILM AND METHOD FOR MANUFACTURING THE SAME

(71) Applicant: HON HAI PRECISION INDUSTRY CO., LTD., New Taipei (TW)

(72) Inventors: Chau-Jin Hu, New Taipei (TW);
Feng-Yuen Dai, New Taipei (TW);
Kun-Chan Wu, New Taipei (TW);
Jia-Ming Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 108 days.

(21) Appl. No.: 14/219,022

(22) Filed: Mar. 19, 2014

(65) Prior Publication Data
US 2015/0185373 A1 Jul. 2, 2015

(30) Foreign Application Priority Data

Dec. 27, 2013 (TW) .............................. 102148682 A

(51) Int. Cl.
| | | |
|---|---|---|
| G02B 5/08 | (2006.01) |
| G02B 1/12 | (2006.01) |
| B05D 3/06 | (2006.01) |
| C09D 5/33 | (2006.01) |
| C09D 7/12 | (2006.01) |
| C09D 4/06 | (2006.01) |
| C08K 3/22 | (2006.01) |
| C08K 3/30 | (2006.01) |

(52) U.S. Cl.
CPC ................ *G02B 5/0866* (2013.01); *C09D 4/06* (2013.01); *C09D 5/004* (2013.01); *C09D 7/1216* (2013.01); *G02B 1/12* (2013.01); *C08K 2003/2241* (2013.01); *C08K 2003/3045* (2013.01); *Y10T 428/26* (2015.01); *Y10T 428/31681* (2015.04)

(58) Field of Classification Search
CPC ........ G02B 1/105; G02B 1/12; G02B 5/0866; C09D 4/00; C09D 5/004; C09D 7/1216; C09D 183/06; C08K 2003/2241; C08K 2003/3045; Y10T 428/26; Y10T 428/24893; Y10T 428/31681; B05D 5/063
USPC ............ 428/425.8, 425.9, 461, 463; 427/508, 427/521
See application file for complete search history.

(56) References Cited

U.S. PATENT DOCUMENTS

2002/0113925 A1* 8/2002 Higashi .......................... 349/113
2006/0043864 A1* 3/2006 Cho et al. ....................... 313/311

* cited by examiner

*Primary Examiner* — Thao T Tran
(74) *Attorney, Agent, or Firm* — Novak Druce Connolly Bove + Quigg LLP

(57) ABSTRACT

An exemplary light reflective film painted on a smooth reflective surface of a metal base includes a composition. The composition consists of curing agents and light reflective powders. The curing agents include acrylic monomers, acrylic urethane oligomers, polyester acrylic modified polyester oligomers and photo initiators. A method for manufacturing the light reflective film is also provided.

18 Claims, 1 Drawing Sheet

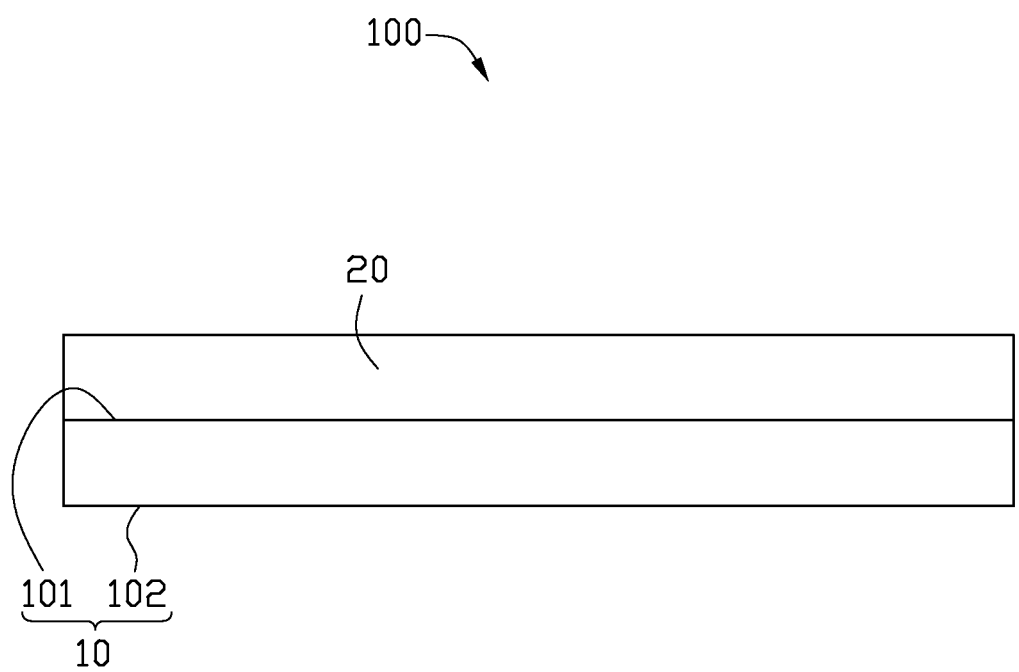

LIGHT REFLECTIVE FILM AND METHOD FOR MANUFACTURING THE SAME

BACKGROUND

1. Technical Field

This disclosure generally relates to light reflective elements, and particularly to a light reflective film and a method for manufacturing the light reflective film.

2. Description of Related Art

A typical backlight module includes a metal substrate with a smooth light reflective surface, light sources mounted on the substrate and a light diffuser over the light sources. Light emitted from the light sources is reflected by the smooth light reflective surface of the metal substrate to travel through the diffuser film to illuminate.

Conventionally, a light reflective film is further provided to be located on the smooth reflective surface of the metal substrate to increase the reflective efficiency of the metal substrate. However, because the reflective surface of the metal substrate is smooth, the light reflective film is not easily to be fixed to the smooth reflective surface of the metal substrate in a predetermined position according to a requirement, which affects the light efficiency of the backlight module.

What is needed, therefore, is a light reflective film and a method for manufacturing the light reflective film which can overcome the forgoing drawback.

BRIEF DESCRIPTION OF THE DRAWINGS

The FIGURE is a cross-sectional view of a light reflective film of an embodiment according to the present disclosure formed on a metal base.

DETAILED DESCRIPTION

Referring to the FIGURE, an exemplary light reflective film 20 formed on a metal base 10 is provided.

The metal base 10 is a flat plate, and is made of a material with good light reflective efficiency, such as copper or aluminum.

The metal base 10 includes a flat and smooth upper surface 101 and a lower surface 102 opposite and parallel to the upper surface 101. In this embodiment, the upper surface 101 is a light reflective surface of the metal base 10.

The light reflective film 20 is formed on the upper surface 101 of the metal base 10, and covers the entire upper surface 101 of the metal base 10. Preferably, a thickness of the light reflective film 20 is 0.2 mm.

The light reflective film 20 is a composition consisting of curing agents and light reflective powders. A mass ration between the curing agents and the light reflective powders is 80%: 20%, 72%: 28%, 70%: 30%, or 65%: 35%.

The curing agents include acrylic monomers, acrylic urethane oligomers, polyester acrylic modified polyester oligomers, and photo initiators. Preferably, a mass of the acrylic monomers is 50% of the total mass of the curing agents, a mass of the acrylic urethane oligomers is 30% of the total mass of the curing agents, a mass of the polyester acrylic modified polyester oligomers is 15% of the total mass of the curing agents, and a mass of the photo initiators is 5% of the total mass of the curing agents.

In this embodiment, the acrylic monomer is isobornyl methacrylate, the acrylic urethane oligomer is aliphatic urethane acrylate, the polyester acrylic modified polyester oligomer is carboxylated polyester acrylate, and photo initiator is hydroxycyclohexyl-phenyl-ketone.

The light reflective powders are white reflective powders. In this embodiment, the light reflective powders are barium sulfate powders or titanium dioxide powders. Preferably, the light reflective powders are titanium dioxide powders with a higher light reflecting efficiency.

The disclosure also relates to a method for manufacturing the light reflective film 20, and the method includes following steps:

S1: providing curing agents and light reflective powders, and mixing the curing agents with the light reflective powders to form a composition in a proportion, the curing agents containing acrylic monomers, acrylic urethane oligomers, polyester acrylic modified polyester oligomers, and photo initiators. In this embodiment, a mass of the acrylic monomers is 50% of the total mass of the curing agents, a mass of the acrylic urethane oligomers is 30% of the total mass of the curing agents, a mass of the polyester acrylic modified polyester oligomers is 15% of the total mass of the curing agents, and a mass of the photo initiators is 5% of the total mass of the curing agents. The light reflective powders are white reflective powders, such as barium sulfate powders or titanium dioxide powders.

S2: providing a metal base 10, and uniformly painting the composition to cover the light reflective surface of the metal base 10. The metal base 10 may be a copper base, an aluminum base, or an iron base.

S3: radiating the composition formed on the light reflective surface of the metal base 10 via ultraviolet light to hardening the composition to attach to the light reflective surface of the metal base 10. In this embodiment, a wavelength of the ultraviolet light ranges from 320 nm to 400 nm, a radiation intensity of the ultraviolet light is 3660.834 mW/cm^2, and a radiation time is 1.35 seconds.

In order to test the adhesion of the light reflective film 20 formed on the reflective surface of the metal base 10, the adhesion of the light reflective film 20 is tested by an adhesion cross-cut test way. And the levels of the tested results ranges from lower class ISO 0 to higher class ISO 5, the lower the level, the better the adhesion of the light reflective film 20.

The light reflective film 20 gets a perfect adhesion reaching level ISO 0, especially when the mass ration between the curing agents and the light reflective powders reaches 80%: 20%, 72%: 28%, 70%: 30%, 65%: 35%.

According to the light reflective film 20 of the disclosure, the light reflective film 20 is a composition containing the curing agents and the light reflective powders, the curing agents includes acrylic monomers, acrylic urethane oligomers, polyester acrylic modified polyester oligomers and photo initiators, and the light reflective film 20 is formed on the light reflective surface of the metal base 10 by a painting way, the light reflective film 20 gets a perfect adhesion, thereby the light reflective film 20 can be easily to be fixed to the smooth light reflective surface in a predetermined position according to a requirement.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A light reflective film painted on a smooth reflective surface of a metal base, the light reflective film formed from a composition consisting of curing agents and light reflective powders, the curing agents comprising acrylic monomers, acrylic urethane oligomers, polyester acrylic modified polyester oligomers and photo initiators, wherein a thickness of the light reflective film is 0.2 mm.

2. The light reflective film of claim 1, wherein a mass ratio between the curing agents and the light reflective powders is 80%: 20%, 72%: 28%, 70%: 30%, or 65%: 35%.

3. The light reflective film of claim 1, wherein a mass of the acrylic monomers is 50% of the total mass of the curing agents, a mass of the acrylic urethane oligomers is 30% of the total mass of the curing agents, a mass of the polyester acrylic modified polyester oligomers is 15% of the total mass of the curing agents, and a mass of the photo initiators is 5% of the total mass of the curing agents.

4. The light reflective film of claim 1, wherein the light reflective powders are white reflective powders.

5. The light reflective film of claim 4, wherein the light reflective powders are barium sulfate powders or titanium dioxide powders.

6. The light reflective film of claim 1, wherein the acrylic monomer is isobornyl methacrylate, the acrylic urethane oligomer is aliphatic urethane acrylate, the polyester acrylic modified polyester oligomer is carboxylated polyester acrylate, and photo initiator is hydroxycyclohexyl-phenyl-ketone.

7. A method for manufacturing a light reflective film, comprising:
providing curing agents and light reflective powders, and mixing the curing agents with the light reflective powders to form a composition in a proportion, the curing agents containing acrylic monomers, acrylic urethane oligomers, polyester acrylic modified polyester oligomers, and photo initiators;
providing a metal base with a smooth light reflective surface and uniformly painting the composition to cover the light reflective surface of the metal base;
radiating the composition on the light reflective surface of the metal base via ultraviolent light to harden the composition and forming the light reflective film on the surface of the metal base, wherein a thickness of the light reflective film is 0.2 mm.

8. The method of claim 7, wherein a wavelength of the ultraviolent light ranges from 320 nm to 400 nm, a radiation intensity of the ultraviolent light is 3660.834 mW/cm^2, and a radiation time is 1.35 seconds.

9. The method of claim 7, wherein a mass ratio between the curing agents and the light reflective powders is 80%: 20%, 72%: 28%, 70%: 30%, or 65%: 35%.

10. The method of claim 9, wherein a mass of the acrylic monomers is 50% of the total mass of the curing agents, a mass of the acrylic urethane oligomers is 30% of the total mass of the curing agents, a mass of the polyester acrylic modified polyester oligomers is 15% of the total mass of the curing agents, and a mass of the photo initiators is 5% of the total mass of the curing agents.

11. The method of claim 7, wherein the light reflective powders are white reflective powders.

12. The method of claim 11, wherein the light reflective powders are barium sulfate powders or titanium dioxide powders.

13. The method of claim 7, wherein the acrylic monomer is isobornyl methacrylate, the acrylic urethane oligomer is aliphatic urethane acrylate, the polyester acrylic modified polyester oligomer is carboxylated polyester acrylate, and photo initiator is hydroxycyclohexyl-phenyl-ketone.

14. A light reflective film painted on a smooth reflective surface of a metal base, the light reflective film formed from a composition consisting of curing agents and light reflective powders, the curing agents comprising acrylic monomers, acrylic urethane oligomers, polyester acrylic modified polyester oligomers and photo initiators, wherein a mass ratio between the curing agents and the light reflective powders is 80%: 20%, 72%: 28%, 70%: 30%, or 65%: 35%.

15. The light reflective film of claim 14, wherein a mass of the acrylic monomers is 50% of the total mass of the curing agents, a mass of the acrylic urethane oligomers is 30% of the total mass of the curing agents, a mass of the polyester acrylic modified polyester oligomers is 15% of the total mass of the curing agents, and a mass of the photo initiators is 5% of the total mass of the curing agents.

16. The light reflective film of claim 14, wherein the light reflective powders are white reflective powders.

17. The light reflective film of claim 16, wherein the light reflective powders are barium sulfate powders or titanium dioxide powders.

18. The light reflective film of claim 14, wherein the acrylic monomer is isobornyl methacrylate, the acrylic urethane oligomer is aliphatic urethane acrylate, the polyester acrylic modified polyester oligomer is carboxylated polyester acrylate, and photo initiator is hydroxycyclohexyl-phenyl-ketone.

* * * * *